May 1, 1951  J. B. SHOCKLEY  2,551,059
SNAP GAUGE
Filed April 22, 1948
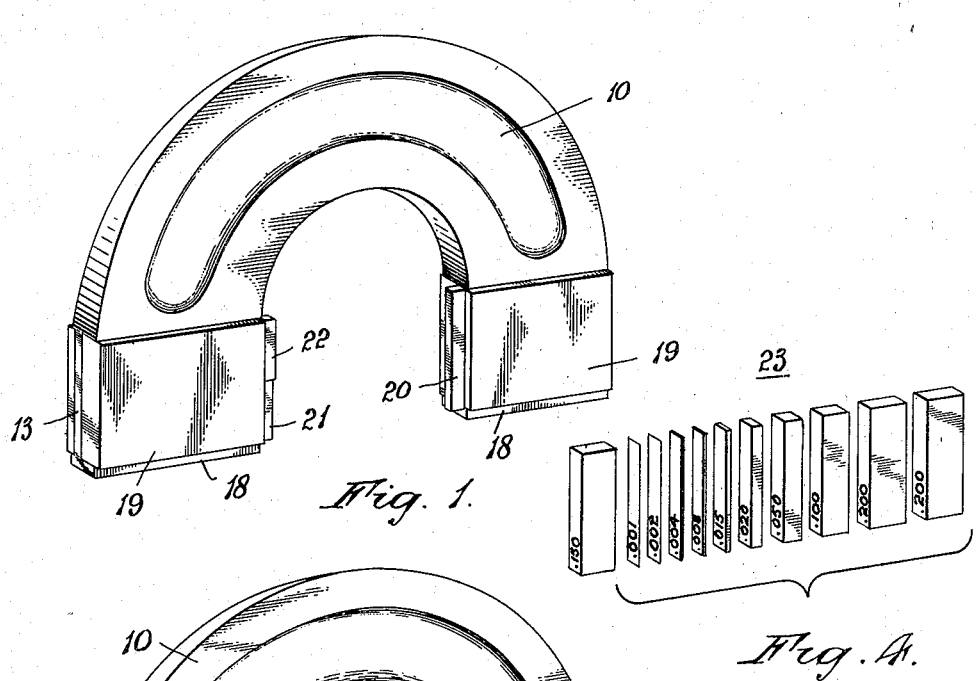
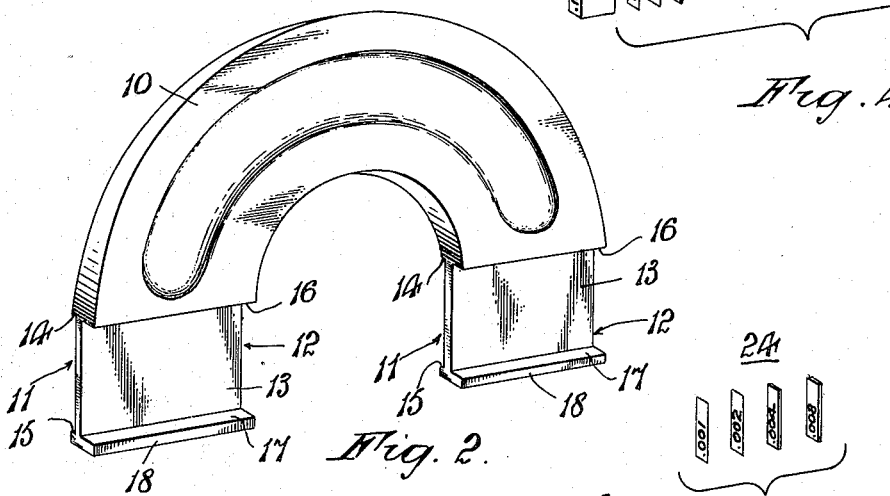
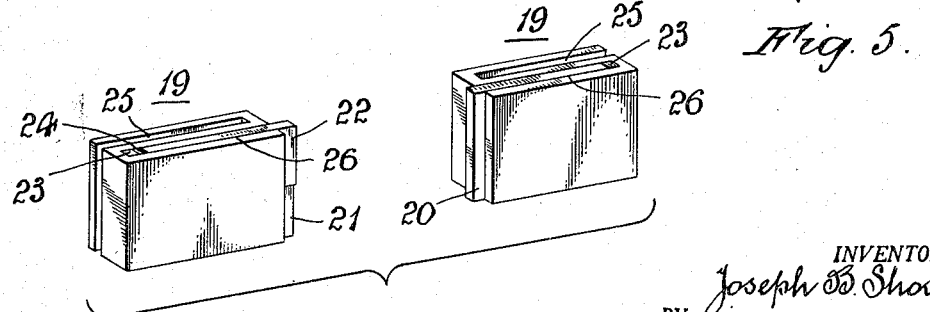
INVENTOR.
Joseph B. Shockley.
BY Stanley Lightfoot.
ATTORNEY.

Patented May 1, 1951

2,551,059

UNITED STATES PATENT OFFICE 2,551,059

SNAP GAUGE

Joseph B. Shockley, Detroit, Mich.

Application April 22, 1948, Serial No. 22,632

3 Claims. (Cl. 33—168)

This invention relates to snap gages for use more particularly in the checking of the diameters of cylindrical work and has for its object to provide a type of adjustable snap gage which may be simply and readily set to the particular gage opening desired without resort to screws or clamps as the adjusting or locking means and without necessitating the use of master gage blocks to check or determine the setting of the gage surfaces when adjustment is being effected.

Commonly, snap gages are in the form of a C frame, one or both of the legs of which are provided with slidable or screw-operated adjustable gaging members. In such types of snap gage means, such as clamping screws, are provided to lock the adjustable gaging members in positions of setting.

Careless use of such gages can reduce the efficiency of the clamping means so as to distort or vary the gaging surfaces when the clamping is effected, or permit the adjustable elements to slip in use, and it is, therefore, an object of the present invention to provide an arrangement of adjustable elements which does not call for the use of such clamping means and which provides at all times for an adequate support of the adjustable elements against slipping or other movement or angular variation which would detract from their accuracy.

Furthermore, the adjustable type of snap gage hereinbefore referred to does not have self-contained means to positively determine the spacing or setting of the gaging elements, so that it is necessary to use a master gage or master blocks for insertion in the gap of the gage to determine the spacing of the elements as they are adjusted and set. This frequently means that the gage must be sent back to the tool crib for setting, or the master blocks brought to the bench for that purpose and afterward returned to their place of storage, all of which is unnecessarily time-consuming.

The present invention contemplates the incorporation in a snap gage of interchangeable pre-gaged and graded setting blocks or shims so concealed and arranged as to be easily interchanged to meet requirements while at the same time being thoroughly protected against loss, shifting, or access thereto of any material which may be deleterious to their proper functioning.

Still further, the said invention contemplates the use in the improved gage of one or more slidable gage elements, of flat plate-like formation, housed in a slot or slots for sliding adjustment in relation to the throat of the gage together with a series of blocks or shims of graded thickness for selective arrangement behind each adjustable member to positively determine the extent to which the forward working end of said member will extend into the throat of the gage and thereby determine the gage opening. Where two of these adjustable members are utilized they are preferably arranged directly opposite one another, and the working surface of each member may be flat, wedge-shaped, or of other such form as may be necessary or desirable according to the type of work to be checked.

It is further contemplated that one of the adjustable members may be divided to provide two gaging surfaces, one of which may be projected ahead of the other to provide the "go" and "no-go" gaging relationship well known in this art, additional graded shims being provided for insertion behind the projected "no-go" portion of the adjustable element to determine the amount of advance of its working surface beyond that of the "go" portion of the adjustable element.

Still further, the said invention contemplates the provision of removable holders for said slidable gage elements whereby said holders are detachable and interchangeable on the legs of the caliper frame and, more particularly, the invention contemplates that such holders be of a substantially angular S formation characterized by oppositely disposed recesses, one of which recesses is slidable over a corresponding web provided in the leg of the caliper frame and the other recess accommodates the slidable gage member and its selected set of graded shims. It is proposed that the upper and lower ends of said recesses be overlapped by shoulders provided in the leg of the caliper frame, at the upper and lower extremities of the web, for complete housing and protection of the parts housed in the said recesses.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein:

Figure 1 is a perspective view of a snap gage embodying the said invention;

Figure 2 is a similar view of the caliper frame with the adjustable gage elements and their holders removed therefrom;

Figure 3 is a perspective view of the two S-shaped holders removed from the caliper frame, showing the adjustable gage elements in position therein together with their graded shims;

Figure 4 illustrates a suitable set of eleven graded shims affording adjustments from .001" to .750"; and Figure 5 illustrates a set of four shims graded to provide adjustment of the "no-go" portion of an adjustable element to afford offset adjustments thereof of .001" to .015".

Similar characters of reference indicate similar parts in the several figures of the drawing.

A U-shaped caliper frame 10 is shown, the legs of which are each slotted on opposite sides, as at 11 and 12, to provide a relatively thin web 13 terminating in a foot 18. The slot 11 is preferably materially shallower than is the slot 12, for reasons which will become apparent, and this slotting of the legs of the caliper frame provides shoulders 14—15 and 16—17 defining the top and bottom of the slots as viewed in Figure 2 of the drawing.

A pair of rectangular blocks, generally numbered 19, are provided, each block being characterized by its being slotted from either end, as at 25 and 26, so that they are of an angular S formation as viewed in plan, the slot 25 being proportioned to slide over the web 13 of the caliper frame; and the height of the block is such that its upper and lower surfaces will abut the shoulders 14—15 and 16—17, respectively, of the said caliper frame, whereby, when the two blocks are positioned on the webs 13 of the caliper frame, they will occupy the relationship shown in Figure 1. In this position the innermost ends of the said slots 25 bottom against the inner edges of the webs 13, and the said blocks are thus firmly held in a definite spaced relation to one another and resist any pressures tending to increase this space, as will be readily apparent.

Located in the slot 26 of one of the blocks 19 is a slidable plate 20 operating as a gaging member, this plate being of the same height as the said block; and in the other block 19 I show two such plates 21 and 22 each of half the height of the block, and so totaling the full height thereof and similarly slidable in the slot 26 of that particular block. These two plates are also adjustable gage members and the adjustment of all of these gage members—20, 21, and 22—is effected by means of graded shims or inserts, as will be explained.

It will be seen that the portion of each block 19 which includes the slot 26 is housed in the deeper recesses 12 of the legs of the caliper frame, when the blocks are in position as shown in Figure 1, so that the shoulders 16 and 17 span the upper and lower ends, respectively, of the slots 26 and, therefore, protectively conceal the upper and lower ends of the said slots as well as provide guiding surfaces for the upper edges of the gage members 20 and 22 and the lower edges of the gage members 20 and 21. Thus these gage members are truly guided for straight line adjustment with respect to each other and are incapable of tilting or other angular positional distortion.

To provide for definitely predetermined adjustment of the gage members 20 and 21 toward one another (so that the gap therebetween may be positively determined), I provide a series, preferably eleven, of graded shims or plates adapted for selective insertion in the slots 26 behind the adjustable gage members. Thus, by providing, for example, eleven shims, generally numbered 23, of the dimensions .001", .002", .004", .008", .015", .020", .050", .100", .150", .200", and .200", totaling .750", any restriction of the gap between opposed gage members may be obtained from .001" to .750" by simply selecting those shims which will add up to the amount of restriction required and placing some of these so selected shims, according to desire, in the slots 26 behind each of the gage members 20 and 21.

Thus, if the widest opening of the gage illustrated be considered as one and a half inches, it will be apparent that this opening may be reduced, in thousandths, to three-quarters of an inch by using one or more of the shims 23 according to the reduction required. Accordingly, if the gage is to be used to check work of 1.4" diameter, the selected shims may be of the thicknesses of .050" and .020", which we may assume as inserted in the block 19 behind the gage member 21, and .001", .002", .004", .008", and .015" inserted behind the gage element 20 in the other block 19. Of course, all these selected shims may be placed behind only one of the gage elements, say 20, the other gage element 21 simply being used as a fixed anvil in opposition to the said gage element 21. It will be obvious that only one of the gage elements may be adjustable if it be preferred to make the device in that manner.

Where it is desired to provide "go" or "no-go" features in the gage to determine upper and lower limits of the work, the two-part adjustable gage member 21—22 is utilized and one or more of the shorter shims (generally numbered 24 in Figure 5) are inserted behind the portion 22 referred to, so that it is advanced beyond the portion 21 to a corresponding extent. With the four shims of thicknesses .001", .004", .002", and .008", any number of thousandths of advance from .001" to .015" may be obtained by suitable combination thereof.

The sturdiness of the arrangement described will be readily apparent as all gaging pressures are directed through the blocks 19 directly against the legs of the caliper frame, so that no further holding means are necessarily required, especially as the webs 13, slots 25—26 of the blocks 19, and the adjustable gage members 20, 21, and 22 are precision made for accuracy and snug fitting without any undesirable play between the several parts.

It will also be seen that where the blocks 19 are removable, which is the construction I prefer, various sets of blocks may be set up with the required shims in position for quick interchangeability one with another, so that the gage may be utilized by a workman to perform several different gaging operations simply by substituting the required block assembly set up for each operation.

It will be still further apparent that the setting of the gage may be quickly and positively changed and determined by simply changing the shims so that, when the movable parts are again firmly pressed into assembled position, no further check by master blocks or otherwise is desired to assure that the correct gage opening is secured.

This invention may be developed within the scope of the following claims without departing from the essential features of the said invention, and it is desired that the specification and drawing be read as being merely illustrative of a practical embodiment of the same and not in a strictly limiting sense.

What I claim is:

1. In a C-shaped snap gage, a fixed body member having legs defining an open throat, an adjustable gage element, slotted holding means on one of the legs of said body member for slidably supporting said adjustable gage element whereby said element may be moved inwardly and outwardly of said throat, and a series of graded-thickness flat parallel-faced shims for selective insertion in the slot of said holding member between the base of said slot and said gaging element to positively determine by their thickness alone the position of advance of said element into said throat.

2. In a C-shaped snap gage, a fixed body member having legs defining an open throat, a pair of adjustable gage elements, slotted holding means on one of said legs for slidably supporting said adjustable gage elements one inwardly of said throat with respect to the other, a series of graded-thickness flat parallel-faced shims for selective insertion in the slot of said holding member said shims being of a length to extend between the base of said slot and both of said gaging elements, and a second series of shorter graded-thickness flat shims for selective insertion in the said slot between said first mentioned shims and the innermost of said gaging elements whereby the longer shims determine the position of advance of the outermost of said elements into said throat and superimposing thereon of said shorter shims determines the still further advance of said innermost element into said throat beyond the lower element.

3. In a snap gage, a C-shaped fixed body member having legs defining an open throat, at least one of said legs being transversely slotted laterally of said throat to form a web in said throat, an adjustable gage element, holding means slotted from one end to engage the web of said leg and from the opposite end to slidably receive said adjustable gage element, and a series of graded flat parallel-faced shims for selective insertion between the inserted end of said gaging element and the base of its respective slot to determine the projection of said element from said holding means into the throat of said body.

JOSEPH B. SHOCKLEY.

REFERENCES CITED

The following references are of record in the file of this patent:

UNITED STATES PATENTS

| Number | Name | Date |
|---|---|---|
| 1,138,438 | Bailey | May 4, 1915 |
| 1,397,189 | Westerberg | Nov. 15, 1921 |
| 1,489,577 | Hanson | Apr. 8, 1924 |